United States Patent [19]

McIlvain et al.

[11] Patent Number: 4,658,714

[45] Date of Patent: Apr. 21, 1987

[54] APPARATUS FOR CUTTING BROCCOLI AND OTHER LONG STEMMED VEGETABLES

[75] Inventors: Jack R. McIlvain, Watsonville; Sherman Thompson, Salinas, both of Calif.

[73] Assignee: J. R. Simplot Company, Boise, Id.

[21] Appl. No.: 792,578

[22] Filed: Oct. 29, 1985

[51] Int. Cl.$^4$ ............................................. A23N 15/02
[52] U.S. Cl. ...................................... 99/637; 99/642; 99/643
[58] Field of Search ................. 99/635, 637, 638, 639, 99/641, 642, 643, 546; 426/481, 484, 518

[56] References Cited

U.S. PATENT DOCUMENTS

| | | | |
|---|---|---|---|
| 3,380,500 | 4/1968 | Alpen | 99/637 |
| 3,478,794 | 11/1969 | Alpen | 99/637 |
| 3,646,977 | 3/1972 | Goodale | 99/643 X |
| 3,695,323 | 10/1972 | Akesson et al. | 99/637 |
| 4,455,929 | 6/1984 | Goudarzi et al. | 99/637 |

*Primary Examiner*—Timothy F. Simone
*Attorney, Agent, or Firm*—Kelly, Bauersfeld & Lowry

[57] ABSTRACT

An improved method and apparatus for cutting broccoli and other similar vegetables into a plurality of longitudinal sections wherein the head of the vegetable is firmly gripped with the stem thereof extending outwardly and then cut longitudinally through the stem and partially through the head. Broccoli can be sectioned in this manner at high production rates without generating an excessive amount of vegetable debris.

15 Claims, 13 Drawing Figures

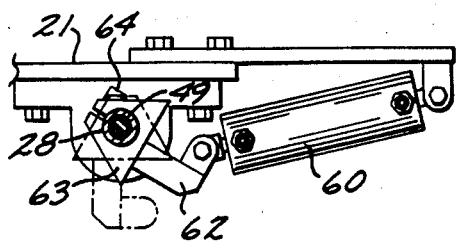
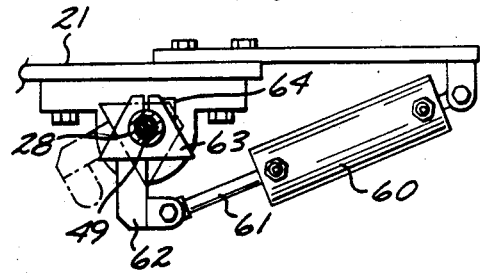
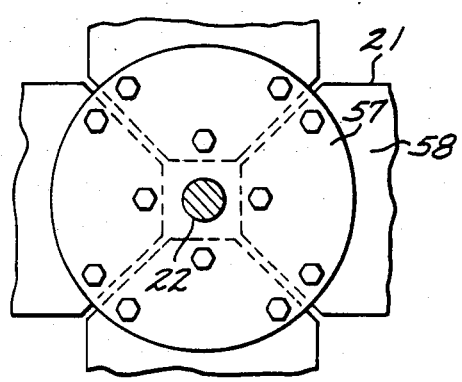
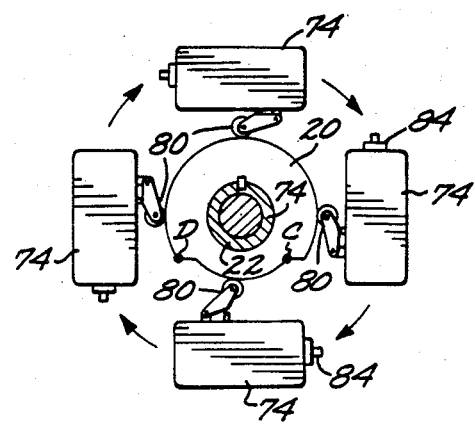
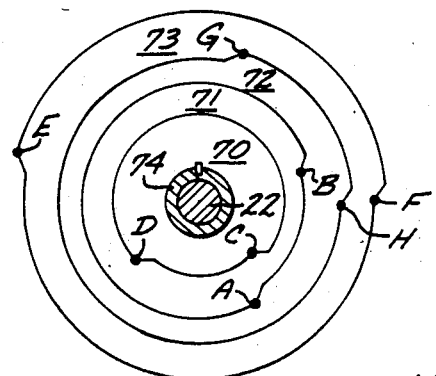
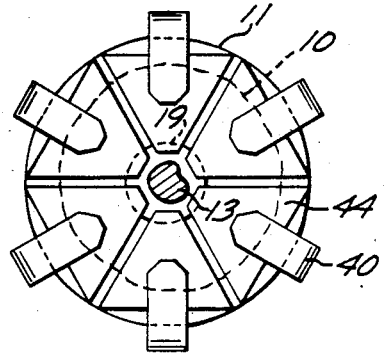
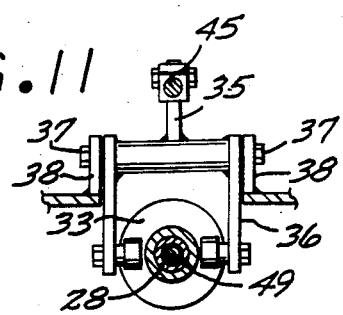
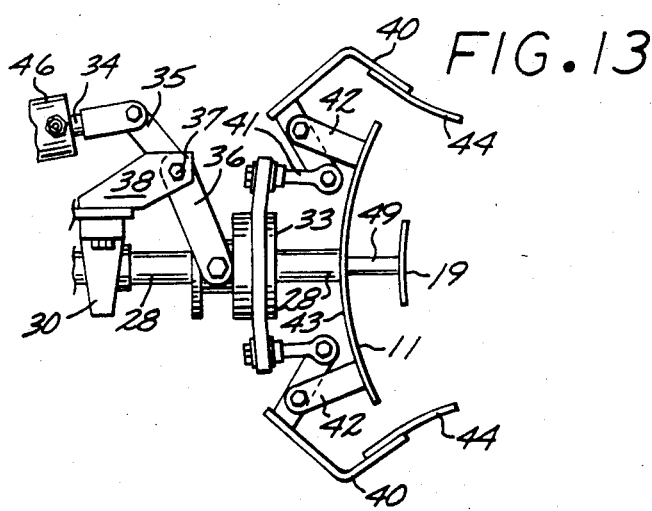

APPARATUS FOR CUTTING BROCCOLI AND OTHER LONG STEMMED VEGETABLES

BACKGROUND OF THE INVENTION

This invention generally relates to the sectioning of long-stemmed vegetables with flowery heads such as broccoli.

In the processing of broccoli and other similar vegetables for packaging and sale the vegetables are sectioned longitudinally and the stems thereof trimmed. For many years, this processing was done manually but the costs for such labor intensive operations have become extremely high. Equipment has been proposed for sectioning and trimming broccoli, but for the most part such equipment could not efficiently and effectively section broccoli at commercially acceptable rates without generating an excessive amount of vegetable debris or without damaging the fragile flowery head of the vegetable.

Devices for cutting and sectioning broccoli are described in the following references: U.S. Pat. No. 3,252,491 (Wooldridge); U.S. Pat. No. 3,380,500 (Alpen); U.S. Pat. No. 3,478,794 (Alpen); U.S. Pat. No. 3,646,977 (Goodale); U.S. Pat. No. 3,695,323 (Kesson et al.); U.S. Pat. No. 3,88,851 (Goodale); U.S. Pat. No. 4,455,929 (Goudarzi et al.).

While devices proposed in the aforesaid patents may have been improvements over manual trimming and sectioning of vegetables, the need remains for equipment which can continuously process such vegetables at commercially acceptable production rates without generating excessive amounts of vegetable debris or damaging the flowery heads of the vegetables. The present invention satisfies this need.

SUMMARY OF THE INVENTION

This invention is directed to an improved method and apparatus for sectioning broccoli and other similar long-stemmed vegetables which have flowery heads. Preferably, the stem is also cut or trimmed in the same processing.

In accordance with the present invention, the head of the broccoli is positioned within gripping means having a plurality of holding elements, preferably flexible in nature, which are urged against the underside of the head to press the head against a support plate or other retaining member, with the stem extending outwardly from the plate. The broccoli is sectioned by cutting through the stem and partially into (but not completely through) the head of the broccoli so that, when the head is released by the gripping means, the individual sections or fleurettes are discharged and separated with very little cutting debris.

In a preferred embodiment, the apparatus has a plurality of operating positions or stations wherein the sectioning and stem trimming operations are conducted. In the first operating position, the broccoli head is inserted into the gripping means wherein flexible holding elements thereof firmly, but gently, grasp the underside of the head and press it against a support plate. The firmly held vegetable is then transported to subsequent stations where the cutting and trimming operations take place. In these subsequent operating positions, the vegetable is sectioned one or more times by cutting through the stem and partially through the head of the vegetable with a blade, which may be stationary or rotary, or other cutting means. When cutting partially through the head, the blade or other cutting means passes through the inner stem and the main branches thereof but does not cut into the minor branches which form the bulk of the flowery outer portion of the head. By not cutting into the minor branches, the generation of large amounts of vegetable debris is avoided, even though the vegetable is not cut completely through, and the individually cut sections readily separate.

After initially sectioning the broccoli, the head thereof is rotated prior to subsequent sectioning. Additionally, the stem may be trimmed to a desired length by means of a blade or other cutting means. After passing through the sectioning and trimming stations, the head is released by the gripping means and the vegetable sections are discharged from the apparatus.

The process and apparatus of the invention can effectively and efficiently section and trim broccoli at high production rates without generating an excessive amount of vegetable debris during such processing. Moreover, the sectioned vegetables are more uniform in size and structure so that they can be more easily packaged and subsequently handled. These and other advantages of the invention will become more apparent from the following detailed description thereof when taken in conjunction with the accompanying exemplary drawings.

BRIEF DESCRIPTION OF THE DRAWINGS

FIGS. 6 and 7 are respectively cross-sectional views taken along the lines of 6—6 shown in FIG. 2 illustrating the operational positions of the mechanism for rotating the arm and gripping apparatus shown in FIGS. 1-3;

FIG. 8 is a cross-sectional view taken along the lines of 8—8 shown in FIG. 2 illustrating the rotating table on which the gripping elements are mounted;

FIG. 9 is a plan view partially in section along the lines of 9—9 shown in FIG. 2 illustrating a cam, the cam followers and switching devices for controlling the gripping means shown in FIGS. 2 and 3;

FIG. 10 is a schematic view of the cams which operate the apparatus shown in FIGS. 2 and 3;

FIG. 11 is a cross-sectional view taken along the lines of 11—11 shown in FIG. 2;

FIG. 12 is a front view of the gripping means shown in FIG. 2 and taken along the lines of 12—12 shown therein illustrating the gripping means in a closed position; and FIG. 13 is a partial side view of the gripping means as shown in FIG. 2 illustrating the gripping means in an open position.

DETAILED DESCRIPTION OF THE INVENTION

Figure 1:
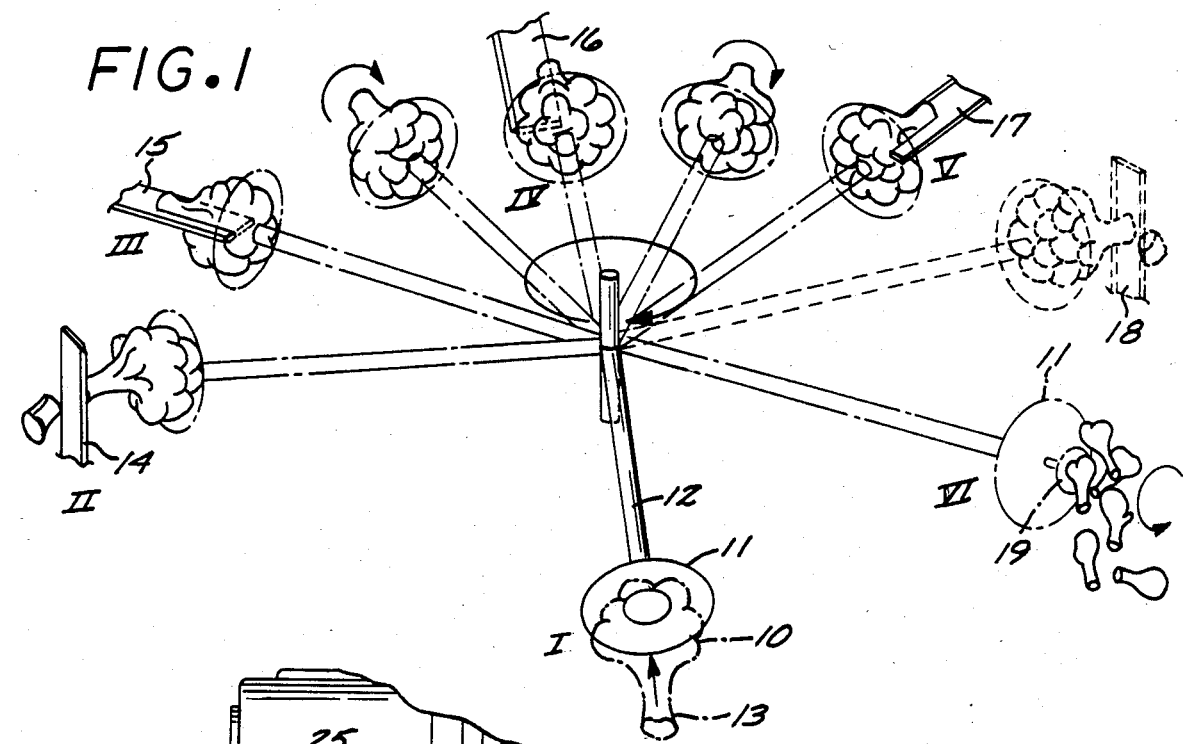
FIG. 1 is a perspective view schematically illustrating the sectioning and trimming of broccoli which involves embodiments of the invention.
Figure 2:
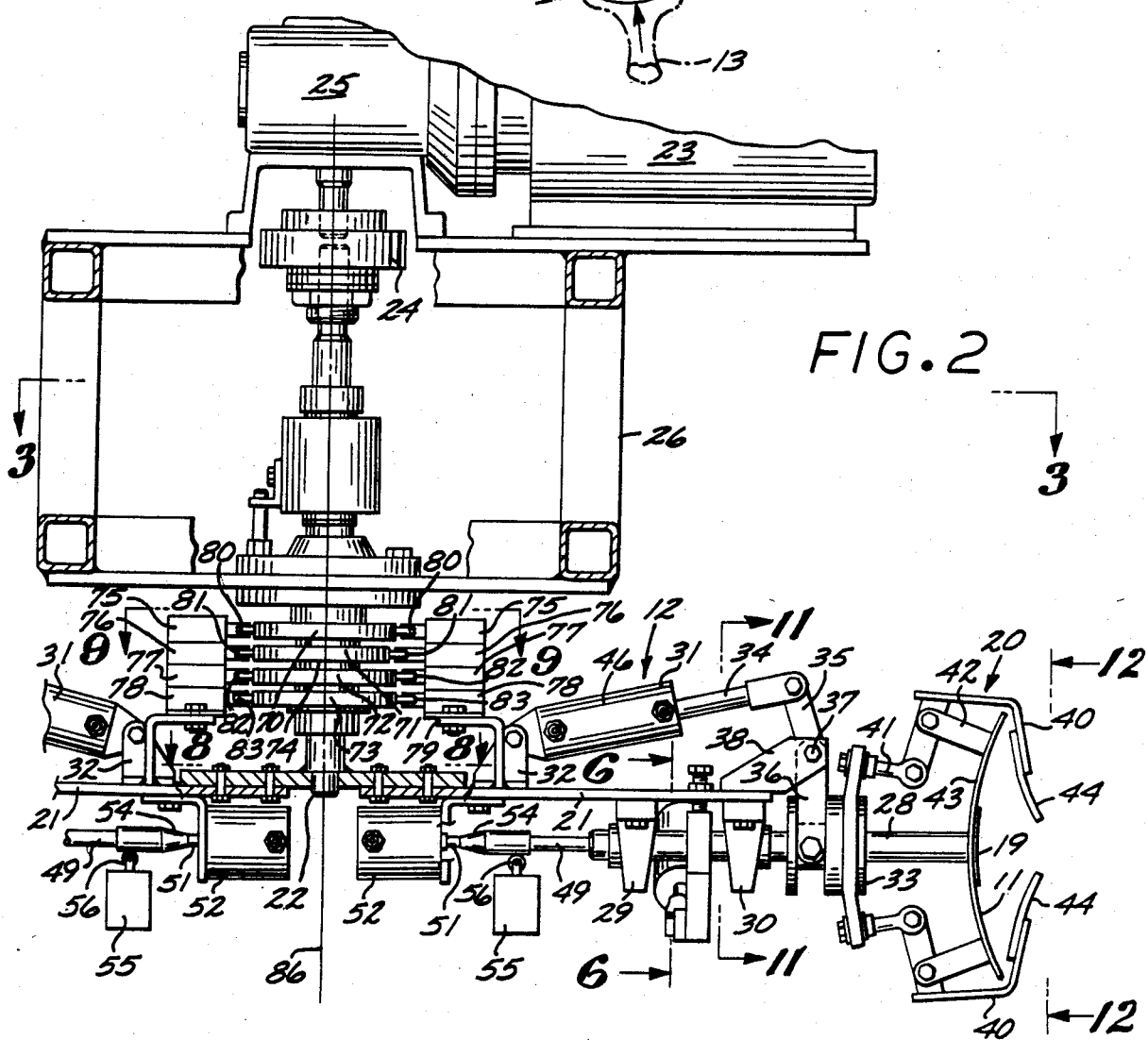
FIG. 2 is an elevational view, partially in section of an apparatus embodying features of the invention for holding and transporting broccoli to facilitate the sectioning and trimming thereof.
Figure 3:
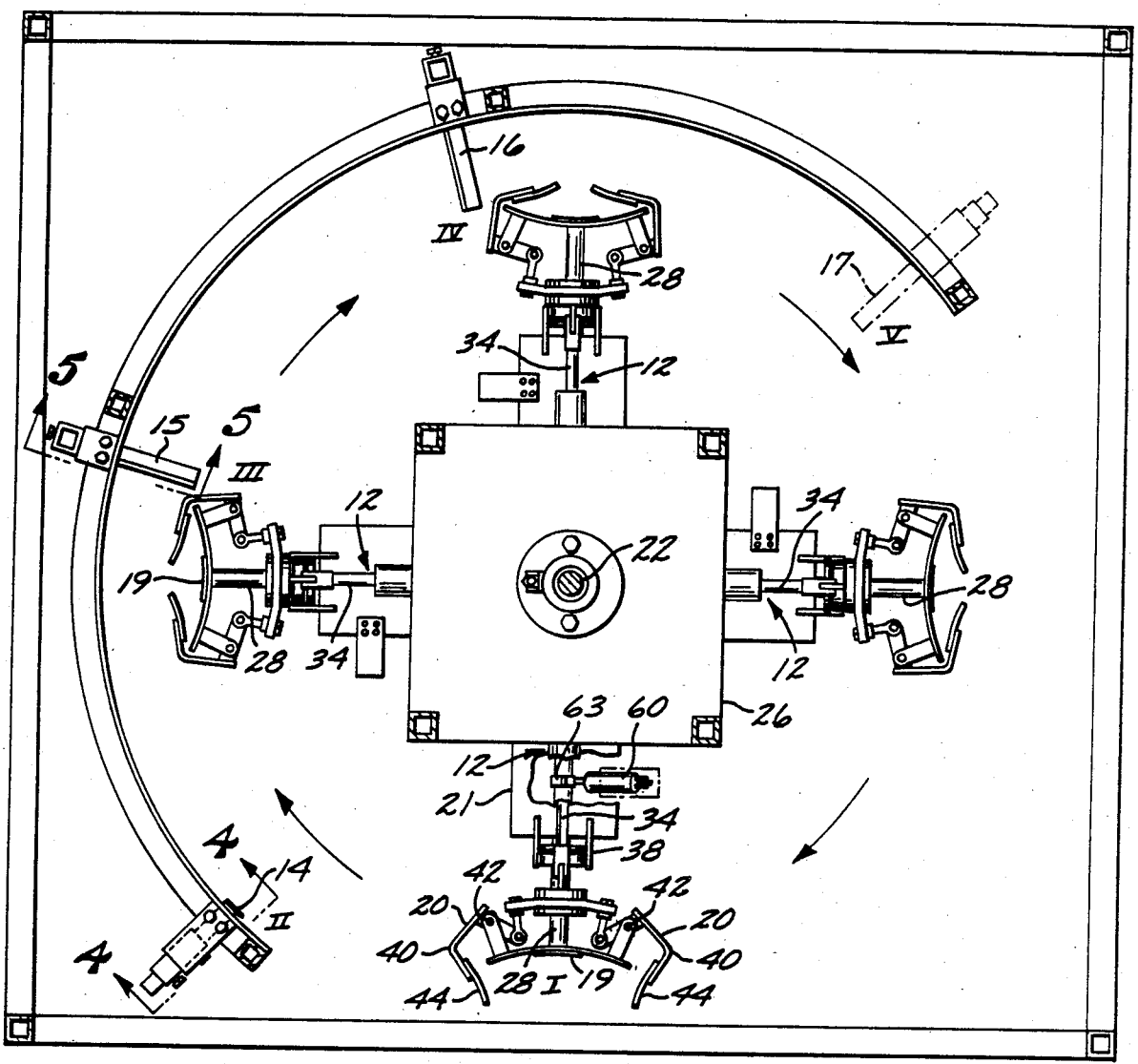
FIG. 3 is a plan view, partially in section, taken along the lines generally shown as 3—3 in FIG. 2 illustrating the overall arrangement of the apparatus of the invention.

Reference is made to FIG. 1 which schematically illustrates the trimming and sectioning of broccoli which embodies features of the present invention. At Stage I the broccoli head 10 is firmly positioned against plate 11 attached to the end of arm 12 with the stem 13 of the vegetable extending outwardly therefrom. The firmly positioned broccoli head 10 is transported in a horizontal plane to Stage II where a vertically disposed blade 14 trims off a portion of the stem 13. The broccoli is then passed to a Stage III where a first horizontally disposed blade 15 passes through the stem 13 and partially into the head 10 to thereby cut the broccoli into two sections. After the initial sectioning in Stage III, the arm 12 and the firmly held head 10 are rotated approximately 60° about the longitudinal axis of arm 12 as shown. At Stage IV a second horizontally disposed blade 16 passes through the previously sectioned stem 13 and partially through the head 10 thereof to cut the broccoli into four sections. After the second sectioning, the arm 12 and the firmly attached head 10 are again rotated approximately 60° about the longitudinal axis of arm 12. At Stage V a third horizontally disposed blade 17 passes through the stem 13 and partially through the head 10 to finally cut the broccoli, resulting in a total of six sections. The sectioned broccoli is then tranported to a discharge position VI where an ejector 19 ejects the broccoli sections as shown. If desired, and as shown in phantom, the stem 13 may be further cut or trimmed by a second vertically disposed blade 18 between Stages V and VI. Although cutting the broccoli into six sections is depicted in FIG. 1, sectioning the broccoli into a greater or lesser number of sections is contemplated FIGS. 2 and 3 illustrate an apparatus embodying features of the invention for cutting and trimming broccoli. The apparatus includes a plurality of radially extending arms 12 which have gripping means 20 at the outer ends thereof and which are mounted on a centrally rotating table 21, with four of said arms 12 being illustrated by way of example in FIG. 3. The table 21 is fixed to one end of a drive shaft 22 which is operatively connected to drive motor 23 by means of coupling 24 and gear reducer 25. The drive motor 23 and gear reducer 25 are supported by frame 26 disposed above the table 21.

Each of the arms 12 has a hollow shaft 28 with a supporting plate 11 fixed to the outer end thereof. Shaft 28 is rotatably journaled in bearing housings 29 and 30 fixed to the underside of table 21. Hydraulic or pneumatic actuator 31 is attached to table 21 by means of bracket 32 and collar 33, which is slidably mounted on shaft 30, is operably connected to push rod 34 of actuator 31 by means of elements 35 and 36. The connecting elements 35 and 36 rotate about a pivotal point 37 on a fixed bracket 38 so that when hydraulic actuator 31 is operated, collar 33 is driven along shaft 28.

Each of the gripping means 20 further includes a plurality of angular or arcuate fingers 40 arranged in a circular array about the supporting plate 11. These fingers 40 are rotatably fixed to the collar extensions 41 on the collar 33 and to posts 42 connected to the back side 43 of the support plate 11 and are opened and closed as a group by the movement of the collar 33 along shaft 28. Flexible holding elements 44 are provided on the ends of fingers 40 to engage the underside of the head 10 of the broccoli and gently but firmly urge the head 10 against the support plate 11. The holding elements 44 which are preferably formed from material such as rubber, leather or elastomers, are generally trapezoidal in shape and are spaced apart from one another so that cutting blades can pass between the elements 44 and into the head 10 as best shown in FIG. 11.

When the actuator 31 is operated to open gripping means 20, the push rod 34 is pulled into the housing 46 and connecting elements 35 and 36 push the collar 33 mounted on shaft 28 toward the support plate 11. Movement of collar 33 in this manner, as shown in FIG. 13, pivots the fingers 40 about their respective posts 42 on the support plate 11 to open the fingers 40 so that the broccoli head 10 can be fed into or the segmented head 10 can be discharged from the gripping means 20. When actuator 31 is operated to close gripping means 20, push rod 34 is extended from the housing 46 (FIG. 2), thereby pushing collar 33 along shaft 28 away from the support plate 11. This movement of collar 33 causes fingers 40 to close as a group and thereby engage the underside of head 10 with holding elements 44 to hold the head 10 against the plate 11.

An ejector rod 49 is axially disposed within the hollow shaft 28 mounted to the underside of table 21 and ejecting element 19 is attached to the distal end of the rod 49. The opposite or proximal end 51 of the rod 49 is positioned adjacent to activating device 52 (FIG. 2) which, when actuated, extends the rod 49 and the attached ejector 19 outwardly to thereby eject the sectioned broccoli away from the support plate 11 when the fingers 40 are in an open position.

When the head 10 is inserted into the open gripping means 20 at Stage I, ejector 19 and rod 49 attached thereto are pushed inwardly by the head 10 causing conical tip 54 on the proximal end 51 of rod 49 to trip switch 55 by pushing roller 56 downwardly. Actuation of switch 55 causes pressurized fluid to flow to actuator 31 to operate same in a closing mode by closing the fingers 40 and the attached holding elements 44 around the underside of the head 10 to hold the head 10 against the support plate 11.

Figures 4, 5:
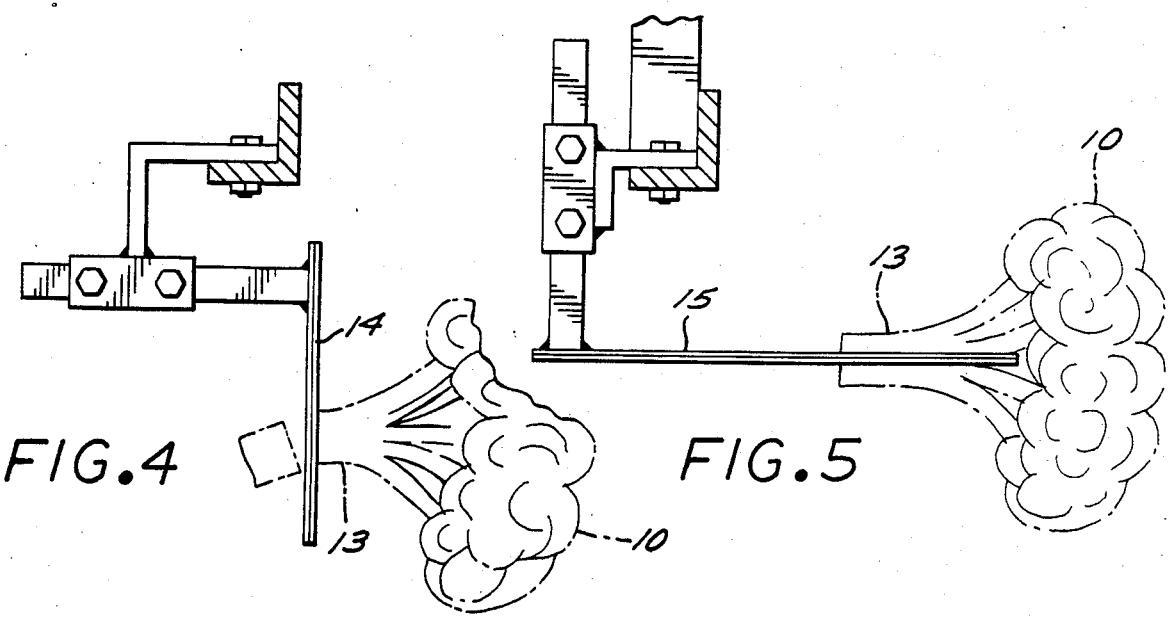
FIG. 4 is a cross-sectional view taken along the lines of 4—4 shown in FIG. 3 illustrating a stem cutting blade.
FIG. 5 is a cross-sectional view taken along the lines of 5—5 shown in FIG. 3 illustrating a sectioning blade and the nature of the cut into the broccoli stem and head.

The cutting of the vegetable is best shown in FIGS. 1, 3, 4 and 5. The arm 12 holding the head 10 rotates in a horizontal plane. The stem 13 initially encounters vertically oriented blade 14 at Stage II which severs a portion of the stem as shown in FIGS. 1 and 4. The arm 12 holding the head 10 is rotated further in the horizontal plane to Stage III where the vegetable engages horizontally disposed blade 15 as shown in FIGS. 1 and 5. The depth of the cut into the head 10 is controlled so that the blade 15 passes through the stem, the major branches, but not completely through the head 10 to avoid cutting through the smaller branches of the head which can generate much vegetable debris while stationary cutting blades are shown in the drawings, rotary blades of various types may be employed.

As shown in more detail in FIGS. 6 and 7, the arm 12 and the gripping means 20 attached thereto are rotated about the longitudinal axis thereof after each of the sectioning stages by means of a second hydraulic or pneumatic actuator 60. Rod 61 associated with actuator 60 is connected to a rotating arm extension 62 which is fixed to the shaft 28 by means of a collar 63. Collar 63 is rigidly tightened to shaft 28 by means of bolt 64. The hydraulic actuator 60 moves the arm extension 62 to three separate positions approximately 60° from one another to effect the rotation of the arm 12 and the gripping element 20 affixed thereto.

Table 21, as shown in FIGS. 2 and 8, is supported from and rotated by drive shaft 22 and comprises a circular support plate 57 fixed to the end of drive shaft 22 and rectangular extensions 58 for each arm 12 which is bolted to plate 57.

The operations of the gripping means 20, as shown in FIGS. 2, 9 and 10, are controlled by a vertical bank of cams 70-73 mounted on a fixed, hollow cam shaft 74 through which the drive shaft 22 passes. Each arm 12 has a vertical bank of switches 75-78 which are mounted to table 21 by means of brackets 79. Cam followers 80-83 ride the perimeters of cams 70-73, respectively, as the table 21 is rotated about a vertical axis 86 by drive shaft 22 and thereby operate their associated switches which control the flow of pressurized fluid through conduits 83 to the control elements associated with the individual arms 12, namely the actuators 31 and 60.

FIG. 9, which is a plan view taken along the lines 9—9 shown in FIG. 2, illustrates the relationship of individual cam 70, the switches 74 which control the fluid through conduits 84 and the cam followers 80 associated therewith for each of the four arms 12 mounted on the table 21. Note that the fluid inlet line to switches 75-78 are not shown to simplify the drawings.

The operations controlled by the cams 70-73 are best shown in FIG. 10, taken in conjunction with FIGS. 2 and 9, wherein the cams are depicted with progressively larger diameters for purposes of illustrating their function. Cam 71 actuates switch 76 which controls the flow of pressurized fluid to actuator 31 to open or close fingers 40 of the gripping means 20. When the cam follower 81 moves from point A to point B on the periphery of cam 71, the fluid from switch 76 causes the gripping means 20 to be closed whereas from point B to point A the gripping means 20 are caused to be opened. However, the cam follower 80, which rides the periphery of cam 70, controls switch 75 which blocks the fluid from switch 76 which causes actuator 3 to close the fingers 40 associated with the gripping means 20. While the cam follower 80 is riding from point C to point D on cam 70, fluid from switch 76 is blocked until cam follower 80 reaches point D, at which point switch 75 is deactivated thereby unblocking the fluid controlled by switch 76. However, if the ejector 19 is pushed against the surface of the support plate 11 during the blocking period, for example, when a broccoli head 10 is inserted into the gripping means 20, switch 55 (shown in FIG. 2) is tripped by the conical camming surface 54 on rod 49, thereby activating hydraulic actuator 31 to close the gripping means 20. If the switch 55 is not manually actuated to close the gripping means 20 by the time the cam follower 80 reaches point D, switch 75 is automatically deactivated as previously described to thereby unblock the fluid flow from switch 76 to the actuator 36 so that the gripping means 20 is closed. Switch 76 remains unblocked until cam follower 80 again reaches point C where the cycle is repeated.

The gripping means 20 remains closed until the cam follower 81 reaches position B on cam 71, at which point switch 76 is actuated to cause hydraulic actuator 36 to push collar 33 toward the support plate 11 to open the gripping means 20. Simultaneously, actuator 52 is activated to push ejector rod 49 outwardly so that ejector 19 ejects sectioned broccoli head 10 from the gripping means 20.

Cams 72 and 73 control the operation of actuator 60 which rotates the arm 12 about its longitudinal axis. When the cam follower 83 reaches point E on cam 73 (after the initial sectioning of the broccoli at Stage III), the actuator 60 rotates the arm extension 62, and thus arm 12, through an angle of approximately 60° so that a second sectioning of the broccoli can be effected at Stage IV with the knife 16. When the cam follower 82 associated with cam 72 reaches point G on the surface thereof (after the second sectioning of the broccoli at Stage IV), the actuator 60 rotates the arm extension 62, and thus arm 12, through another angle of approximately 60° so that a third sectioning of the broccoli can be effected at Stage V with the knife 17. As the table 21 continues to be rotated about the axis of drive shaft 22, the cam followers 83 and 84 reach points F and H respectively where switches 77 and 78 are actuated to cause the actuator 60 to rotate the arm 12 180° back to its original position. However, just before the actuator 60 effects the 180° rotation of arm 12 back to its original position, cam follower 81, associated with cam 71, causes switch 76 to open the gripping device 20 and activator device 52 pushes ejector 19 to thereby eject the sectioned broccoli head 10. In this manner, any loose pieces of broccoli will become disengaged from the fingers 40 when the gripping means 20 is rotated.

It is to be understood that modifications and improvements can be made to the invention without departing from the scope thereof. For example, while fluid actuating means are described herein as means to operate the holding and rotating functions of the apparatus, electrically actuated means would be fully equivalent. Additionally, the invention is described in terms of rotating the vegetable and transporting it from cutting station to cutting station, whereas, it should be apparent that the vegetable can be held in position and the blades or other cutting means be transported to the vegetable and the cutting means can be rotated with respect to the vegetable.

We claim:
1. An apparatus for cutting a vegetable such as broccoli into a plurality of sections, such vegetable having a long stem and a flowery head, said apparatus comprising:
   a. means to hold the head of the vegetable with a stem thereof extending outwardly;
   b. means to cut longitudinally through the stem and partiallfy into the flowery head thereof; and
   c. means to release the head of the sectioned vegetable;
   d. said holding means including a plurality of holding elements which press against the underside of the head to thereby urge the head against a support or retaining member, an elongated shaft having the support or retaining member fixed to one end thereof, collar means slidably mounted on the shaft, a plurality of outwardly extending arcuate or angular fingers rotatably mounted to the collar and rotatably mounted to posts extending outwardly from the rear face of the support or retaining member, and means to move the collar along said shaft to rotate the fingers and thereby move the free ends thereof as a group toward and away from the support or retaining member.

2. The apparatus of claim 1 including means to transport the held vegetable to a plurality of cutting stations where cutting means cut longitudinally through the stem and partially through the head thereof.

3. The apparatus of claim 2 wherein means are provided to rotate the vegetable holding means with respect to the cutting means when the holding means passes between cutting stations.

4. The apparatus of claim 1 wherein an ejector element is provided with the support or retaining member to push the sectioned vegetable away from the support or retaining member when the holding elements release the vegetable head so as to discharge the vegetable sections.

5. The apparatus of claim 1 wherein flexible housing elements are provided on the free ends of the fingers.

6. The apparatus of claim 5 wherein the flexible holding elements are formed from a flexible material selected from the group consisting of leather, rubber and elastomers.

7. The apparatus of claim 5 wherein the flexible elements are trapezoidal in shape.

8. The apparatus of claim 1 wherein a plurality of holding means are mounted on a rotating table.

9. The apparatus of claim 8 wherein a drive shaft connected to an electrical motor is provided to rotate the table.

10. The apparatus of claim 1 wherein the sequencing of the holding and cutting operations are controlled by a plurality of cams, contacted by associated cam followers which operate switching devices which control operating means for holding and cutting.

11. The apparatus of claim 4 wherein a rod, which is fixed to the ejector element and is adapted to operate said element, is disposed within a longitudinal passageway provided in the elongated shaft.

12. The apparatus of claim 3 wherein the means to rotate the holding means includes an extension with one end thereof fixed to the elongated shaft and the other end thereof attached to fluid or electrically actuated movement means.

13. The apparatus device of claim 10 wherein the operating means include fluid or electrically actuated movement means.

14. The apparatus device of claim 13 wherein the movement means is connected to the collar by means of an elongated connecting element rotatably mounted on a bracket, with one end of the connecting element fixed to the movement means and one end to the collar.

15. An apparatus for cutting vegetables having a long stem and a flowery head, such as broccoli, into a plurality of sections comprising:
   a. a plurality of means to hold the heads of vegetables, each of said holding means having a support surface and a plurality of holding elements which cooperatively engage the underside of the head of a vegetable and urge the head against said support surface to position the vegetable with the stems thereof extending outwardly from the support surface;
   b. a loading station where the head of a vegetable is mounted into the holding means;
   c. a plurality of cutting stations where the vegetable is sectioned;
   d. a discharge station where the sectioned vegetable is released from the holding means;
   e. a table supporting said plurality of holding means and adapted to sequentially transport each of said holding means to said loading station to said plurality of cutting stations, and then to said discharge station;
   f. cutting means at said cutting stations to cut longitudinally through the extending stems of the vegetables and partially into the flowery heads thereof;
   g. means disposed between cutting stations to rotate the vegetables and to thereby present the vegetables to the cutting means which follows in the proper orientation in order to section the vegetables in a desired manner; and
   h. means at said discharge station to release the sectioned vegetables from the holding means to discharge such vegetables from the apparatus.

* * * * *